US012795451B2

(12) United States Patent
Bansal et al.

(10) Patent No.: US 12,795,451 B2
(45) Date of Patent: Nov. 10, 2026

(54) CELLULAR SYSTEM OBSERVABILITY ARCHITECTURE INCLUDING SHORT TERM AND LONG TERM STORAGE CONFIGURATION

(71) Applicant: Boost SubscriberCo L.L.C., Englewood, CO (US)

(72) Inventors: Ashish Bansal, Englewood, CO (US); Siddhartha Chenumolu, Englewood, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 399 days.

(21) Appl. No.: 18/134,630

(22) Filed: Apr. 14, 2023

(65) Prior Publication Data

US 2023/0337060 A1 Oct. 19, 2023

Related U.S. Application Data

(60) Provisional application No. 63/331,306, filed on Apr. 15, 2022.

(51) Int. Cl.
*H04W 28/14* (2009.01)
*H04W 28/08* (2023.01)

(52) U.S. Cl.
CPC ....... *H04W 28/14* (2013.01); *H04W 28/0892* (2020.05)

(58) Field of Classification Search
CPC ............ H04W 64/00; H04W 52/0229; H04W 52/0235; H04W 68/025; H04W 76/28; H04W 24/10; H04W 52/0206; H04W 52/0216; H04W 52/0232; H04W 64/006; H04W 8/24; H04W 52/02; H04L 5/0048; H04L 5/0053; H04L 5/00
See application file for complete search history.

(56) References Cited

U.S. PATENT DOCUMENTS 11,206,205 B1 12/2021 Gupta et al.
11,616,713 B2 * 3/2023 Gupta ................ H04L 41/0894 709/220
11,711,284 B2 7/2023 Svennebring et al.
11,770,398 B1 9/2023 Erlingsson et al.
11,861,007 B1 1/2024 Ciubotariu et al.
11,900,350 B2 * 2/2024 Balaoro ............... G06Q 20/209
11,943,045 B2 3/2024 Barbieri et al.
12,155,569 B1 11/2024 Cirkovic et al.
(Continued)

FOREIGN PATENT DOCUMENTS

CN 112698915 A 4/2021

*Primary Examiner* — Nathan S Taylor
(74) *Attorney, Agent, or Firm* — Seed Intellectual Property Law Group LLP

(57) ABSTRACT

A system for cellular system observability data collection includes systems generating data; an observability (OBF) layer configured to collect the data and store the data for a maximum threshold amount of time; and a long term storage layer. The long term storage layer is in communication with the OBF layer to store the data for a term greater than the maximum threshold amount of time. Use applications requiring data to be not older than the maximum threshold amount of time retrieve data directly from the OBF layer, while other use applications retrieve data from the long term storage layer.

15 Claims, 10 Drawing Sheets

(56) References Cited

U.S. PATENT DOCUMENTS

| | | | | |
|---|---|---|---|---|
| 2011/0050395 | A1 | 3/2011 | Ervin | |
| 2011/0275364 | A1 | 11/2011 | Austin et al. | |
| 2013/0003923 | A1 | 1/2013 | Sackett | |
| 2014/0200992 | A1 | 7/2014 | Wang et al. | |
| 2014/0351011 | A1* | 11/2014 | Wang | G06Q 30/0202 705/7.31 |
| 2016/0261727 | A1 | 9/2016 | Yang et al. | |
| 2018/0069932 | A1 | 3/2018 | Tiwari et al. | |
| 2018/0101803 | A1 | 4/2018 | Tiwari et al. | |
| 2018/0248771 | A1 | 8/2018 | Côtéet al. | |
| 2019/0370800 | A1 | 12/2019 | Song et al. | |
| 2020/0028756 | A1* | 1/2020 | Hale | G06F 16/137 |
| 2020/0034216 | A1 | 1/2020 | Kolodzieski et al. | |
| 2020/0042365 | A1 | 2/2020 | Tanna et al. | |
| 2020/0084118 | A1 | 3/2020 | Gudipati et al. | |
| 2020/0136929 | A1 | 4/2020 | Takla et al. | |
| 2020/0183603 | A1* | 6/2020 | Takla | G06F 13/362 |
| 2020/0348984 | A1 | 11/2020 | Giannetti et al. | |
| 2020/0394455 | A1 | 12/2020 | Lee et al. | |
| 2021/0144517 | A1 | 5/2021 | Guim Bernat et al. | |
| 2021/0271506 | A1* | 9/2021 | Ganguly | H04L 41/04 |
| 2021/0273862 | A1 | 9/2021 | Bruun et al. | |
| 2021/0318914 | A1 | 10/2021 | Moyer et al. | |
| 2021/0357280 | A1 | 11/2021 | Long et al. | |
| 2021/0400165 | A1 | 12/2021 | Hao et al. | |
| 2022/0014963 | A1 | 1/2022 | Yeh et al. | |
| 2022/0038902 | A1 | 2/2022 | Mueck | |
| 2022/0086218 | A1 | 3/2022 | Sabella et al. | |
| 2022/0116302 | A1* | 4/2022 | Gupta | H04L 41/0894 |
| 2022/0158926 | A1* | 5/2022 | Wennerström | H04L 43/20 |
| 2022/0166701 | A1 | 5/2022 | Fagan | |
| 2022/0171648 | A1 | 6/2022 | Rodriguez et al. | |
| 2022/0200869 | A1* | 6/2022 | Erlingsson | H04L 67/10 |
| 2022/0222034 | A1 | 7/2022 | Kwatra et al. | |
| 2022/0231948 | A1 | 7/2022 | Zheng | |
| 2022/0272510 | A1 | 8/2022 | Samdanis et al. | |
| 2022/0278926 | A1* | 9/2022 | Sharma | H04L 45/586 |
| 2022/0279421 | A1* | 9/2022 | Sivakumar | H04L 45/586 |
| 2022/0300296 | A1* | 9/2022 | Sharma | G06F 9/4498 |
| 2022/0318068 | A1* | 10/2022 | Shilawat | G06Q 50/60 |
| 2022/0330187 | A1 | 10/2022 | Cheng et al. | |
| 2022/0337495 | A1* | 10/2022 | Safavi | H04L 41/16 |
| 2023/0004447 | A1* | 1/2023 | Seth | G06F 9/5077 |
| 2023/0006889 | A1 | 1/2023 | Thyagaturu et al. | |
| 2023/0007474 | A1* | 1/2023 | Ni | H04L 63/029 |
| 2023/0067168 | A1* | 3/2023 | Sharma | G06F 3/0486 |
| 2023/0079209 | A1* | 3/2023 | Nallamothu | H04L 12/4641 709/238 |
| 2023/0104568 | A1* | 4/2023 | Miriyala | H04L 45/42 718/104 |
| 2023/0107891 | A1* | 4/2023 | Miriyala | H04L 41/122 370/254 |
| 2023/0125133 | A1 | 4/2023 | Dreiling et al. | |
| 2023/0140034 | A1* | 5/2023 | Bui | H04L 41/0806 709/203 |
| 2023/0153162 | A1* | 5/2023 | Baillargeon | G06F 9/5044 718/104 |
| 2023/0259438 | A1 | 8/2023 | Dugas et al. | |
| 2023/0289193 | A1* | 9/2023 | Guntupalli | H04W 24/08 |
| 2023/0315580 | A1 | 10/2023 | Hendrey | |
| 2023/0327952 | A1 | 10/2023 | Reehil, III et al. | |
| 2023/0336433 | A1 | 10/2023 | Bansal et al. | |
| 2023/0336601 | A1 | 10/2023 | Bansal | |
| 2023/0337021 | A1 | 10/2023 | Bansal | |
| 2023/0337060 | A1 | 10/2023 | Bansal et al. | |
| 2023/0337061 | A1 | 10/2023 | Bansal | |
| 2023/0337062 | A1 | 10/2023 | Bansal | |
| 2023/0337063 | A1 | 10/2023 | Bansal et al. | |
| 2023/0385121 | A1 | 11/2023 | Kumar et al. | |
| 2024/0031908 | A1* | 1/2024 | Grewal | H04L 45/741 |
| 2024/0106846 | A1* | 3/2024 | Kapoor | H04L 63/10 |
| 2024/0214841 | A1 | 6/2024 | Nocete et al. | |
| 2024/0214924 | A1 | 6/2024 | Nocete et al. | |
| 2024/0214925 | A1 | 6/2024 | Nocete et al. | |
| 2024/0241711 | A1* | 7/2024 | Baillargeon | G06F 8/65 |
| 2024/0248763 | A1* | 7/2024 | Kita | G06F 9/5038 |
| 2024/0275694 | A1* | 8/2024 | Kita | H04L 41/142 |
| 2024/0276343 | A1* | 8/2024 | Kita | H04W 40/12 |
| 2024/0276361 | A1* | 8/2024 | Kita | H04L 45/302 |
| 2024/0323102 | A1* | 9/2024 | Kita | H04L 41/5003 |
| 2024/0323890 | A1* | 9/2024 | Kita | H04L 41/0897 |
| 2024/0414574 | A1 | 12/2024 | Alworth | |
| 2024/0422053 | A1 | 12/2024 | Shahwaiz | |
| 2024/0422681 | A1 | 12/2024 | Rajendran | |
| 2025/0013657 | A1 | 1/2025 | Farooq | |

* cited by examiner

CELLULAR SYSTEM OBSERVABILITY ARCHITECTURE INCLUDING SHORT TERM AND LONG TERM STORAGE CONFIGURATION

BACKGROUND

Demand for mobile bandwidth continues to grow as customers access new services and applications. To remain competitive, telecommunications companies must cost-effectively expand their network while also improving user experience.

Radio access networks (RANs) are an important element in mobile cellular communication networks. However, they often require specialized hardware and software that requires extensive observability to monitor, collect and store data in order to ensure the systems are running properly and efficiently.

SUMMARY

Various embodiments provide solutions to provide systems and methods for collecting data into short term data storage layers and long term data storage layers.

For example, according to an embodiment, disclosed is a system for cellular system observability data collection. The system includes domains and the domains include systems generating data; an observability (OBF) layer configured to collect the data and store the data for a maximum threshold amount of time; and a long term storage layer. The long term storage layer is in communication with the OBF layer to store the data for a term greater than the maximum threshold amount of time. Use applications requiring data to be not older than the maximum threshold amount of time retrieve data directly from the OBF layer, while other use applications retrieve data from the long term storage layer.

BRIEF DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS

Figure 1:
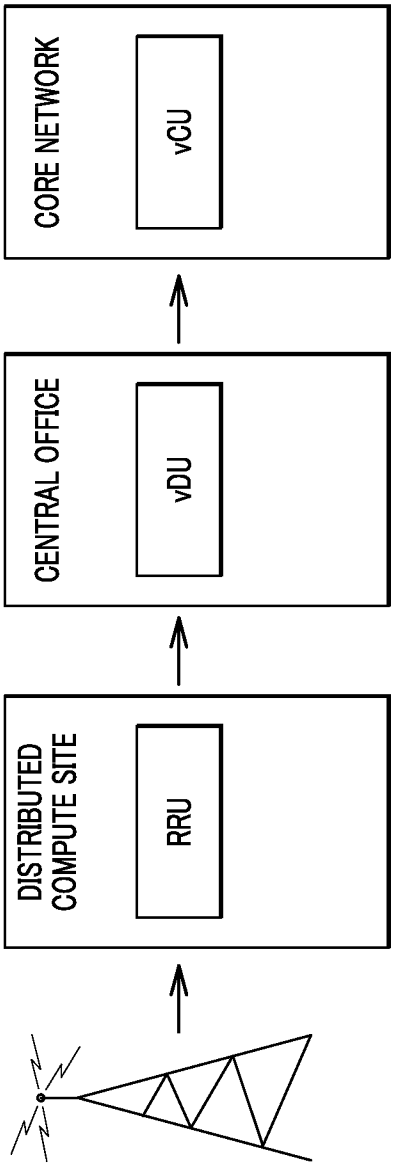
FIG. 1 illustrates a high level block diagram showing a 5G cellular network using vDUs and a vCU.

As mentioned above, various embodiments provide running kubernetes clusters along with a radio access network ("RAN") to coordinate workloads in a cellular network, such as a 5G cellular network.

Broadly speaking, embodiments of the present invention provide methods, apparatuses and computer implemented systems for configuring a 5G cellular network using servers at cell sites, cellular towers and kubernetes clusters that stretch from a public network to a private network.

Establishing a Cellular Network Using Containerized Applications

First, the configuration using containerized application is discussed below. The containerized application can be any containerized application but is described herein as kubernetes clusters for ease of illustration, but it should be understood that the present invention should not be limited to kubernetes clusters and any containerized applications could instead be employed. In other words, the below description uses kubernetes clusters and exemplary embodiments but the present invention should not be limited to kubernetes clusters.

A kubernetes cluster may be part of a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such containerized applications (e.g., kubernetes clusters) to deploy a RAN so that the virtual distributed unit ("vDU") (also referred to herein as the "DU") of the RAN is located at one cluster and the virtual central unit ("vCU") (also referred to herein as the "CU") is located at a remote location from the vDU, according to some embodiments. This configuration allows for a more stable and flexible configuration for the RAN.

With the above overview in mind, the following description sets forth numerous exemplary details in order to provide am understanding of at least some embodiments of the present invention. It will be apparent, however, to one skilled in the art that the present invention may be practiced without some or all of these details described herein and thus, should not be limited. Operations may be done in different orders, and may or may not include some of the processes described herein. Several exemplary embodiments of the invention will now be described in detail with reference to the accompanying drawings.

FIG. 1 illustrates a system that delivers full RAN functionality using network functions virtualization (NFV) infrastructure. In the embodiment shown in FIG. 1, the RAN includes a tower, radio unit (RU), a DU, a CU, and an element management system (EMS) (not shown). This approach decouples baseband functions from the underlying hardware and creates a software fabric. Within the solution architecture, virtualized baseband units (vBBU) process and dynamically allocate resources to remote radio units (RRUs) based on the current network needs. Baseband functions are split between CU and the DUs that can be deployed in aggregation centers or in central offices (or data centers) using a distributed architecture, such as using kubernetes clusters as discussed herein.

The virtualized CUs and DUs run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards may have deterministic, low-latency, and low-jitter signal processing, in some embodiments. These may be achieved using containerized applications (e.g., kubernetes clusters) to control respective DUs, RUs and towers. Moreover, the RAN may support different network topologies, allowing the system to choose the location and connectivity of all network components. Thus, the system allowing various DUs on containerized applications (e.g., kubernetes clusters) allows the network to pool resources across multiple cell sites, scale capacity based on conditions, and ease support and maintenance requirements.

Figure 2:
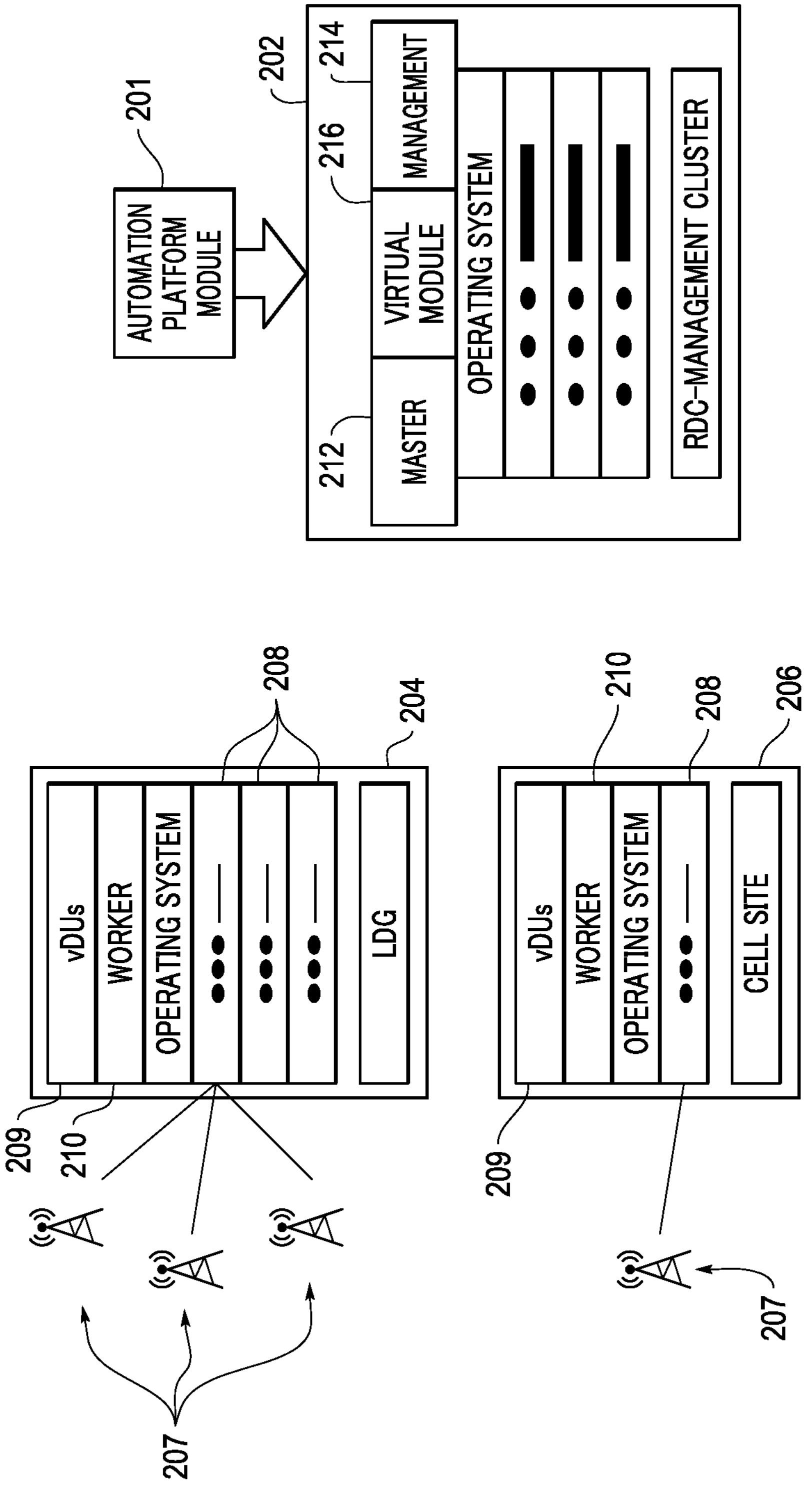
FIG. 2 illustrates a high level block diagram showing 5G cellular network with kubernetes clusters.

FIG. 2 illustrates an exemplary system used in constructing clusters that allows a network to control cell sites, in one embodiment of the invention. The system includes a cluster configuration server that can be used by a cell site to provide various containers for processing of various functions. Each of the cell sites are accessed via at least one cellular tower (and RRU) by the client devices, which may be any computing device which has cellular capabilities, such as a mobile phone, computer or other computing device.

As shown, the system includes an automation platform (AP) module 201, a remote data center (RDC) 202, one or more local data centers (LDC), and one or more cell sites 206.

The cell sites 206 provide cellular service to the client devices through the use of a vDU 209, server 208, and a tower 207. The server 208 at a cell site 206 controls the vDU 209 located at the cell site 206, which in turn controls communications from the tower 207. Each DU 209 is software to control the communications with the towers 207, RRUs, and CU so that communications from client devices (not shown) can communicate from one tower 207 through the kubernetes clusters to another cellular tower 207. In other words, the voice and data from a cellular mobile client device connects to the towers 207 and then goes through the DU 209 to transmit such voice and data to another DU 209 to output such voice and data to another tower 207 using workers 210 networked via a core network/CU.

The server(s) 208 on each individual cell site 206 or LDC 204 may not have enough computing power to run a control plane that supports the functions in the mobile telecommunications system to establish and maintain the user plane. As such, the control plane may be run in a location that is remote from the cell cites 206, such as the RDC 202.

The RDC 202 is the management cluster which manages the LDC 204 and a plurality of cell sites 206. As mentioned above, the control plane may be deployed in the RDC 202. The control plane maintains the logic and workloads in the cell sites 206 from the RDC 202 while each of the containerized applications (e.g., kubernetes containers) is deployed at the cell sites 206. The control plane also monitors the workloads that are running properly and efficiently in the cell sites 206 and fixes any workload failures. If the control plane determines that a workload fails at the cell site 206, for example, the control plane redeploys the workload on the cell site 206.

The RDC 202 may include a master 212 (e.g., kubernetes master), a management module 214 and a virtual (or virtualization) module 216. The master module 212 monitors and controls the workers 210 (also referred to herein as kubernetes workers) and the applications running thereon, such as the DUs 209. If a DU 209 fails, the master module 212 recognizes this, and will redeploy the DU 209 automatically. In this regard, the clusters system has intelligence to maintain the configuration, architecture and stability of the applications running. Accordingly, the clusters system may be considered to be "self-healing".

The management module 214 along with the Automation Platform 201 creates the clusters in the LDCs 204 and cell sites 206.

For each of the servers 209 in the LDC 204 and the cell sites 206, an operating system is loaded in order to run the workers 210. For example, such software could be ESKi and Photon OS. The DUs are also software, as mentioned above, that runs on the workers 210. In this regard, the software layers are the operating system, the workers 210, and then the DUs 209 as illustrated in FIG. 2.

The automation platform module 201 includes a GUI that allows a user to initiate clusters. The automation platform module 201 communicates with the management module 214 so that the management module 214 may create the clusters and a master module 212 for each cluster.

Prior to creating each of the clusters, the virtualization center 216 module creates a virtual machine (VM) so that the clusters can be created. VMs and containers are parts of the containerized applications (e.g., kubernetes clusters) infrastructure of data centers and cell sites. VMs are emulations of particular computer systems that operate based on the functions and computer architecture of real or hypothetical computers. A VM is equipped with a full server hardware stack that has been virtualized. Thus, a VM includes virtualized network adapters, virtualized storage, a virtualized CPU, and a virtualized BIOS. Since VMs include a full hardware stack, each VM may include a complete operating system (OS) to function, and VM instantiation thus may need booting a full OS.

In addition to VMs, which provide abstraction at the physical hardware level (e.g., by virtualizing the entire server hardware stack), containers are created on top of the VMs. Containers provide abstraction at the OS level. In most container systems, the user space is also abstracted. Application presentation systems create a segmented user space for each instance of an application. Applications may be used, for example, to deploy an office suite to dozens or thousands of remote workers. In doing so, these applications create sandboxed user spaces on a server for each connected user. While each user shares the same operating system instance including kernel, network connection, and base file system, each instance of the office suite has a separate user space.

In any event, once the VMs and containers are created, the master modules 212 then create a DU 209 for each VM, as will be described later herein.

FIG. 2 also shows an LDC 204. In some embodiments, the LDC 204 is a data center that can support multiple servers and multiple towers for cellular communications. The LDC 204 is similar to the cell sites 206 except that each LDC 204 has multiple servers 208 corresponding to multiple towers 207 whereby each cell site 206 may only have a single server. Each server in the LDC 204 (as compared with the server in each cell site 206) may support multiple towers. The server 208 in the LDC 204 may be different from the server 208 in the cell site 206 because the servers 208 in the LDC 204 are larger in memory and processing power (number of cores, etc.) relative to the servers 208 in the individual cell sites 206. In this regard, each server 208 in the LDC 204 may run multiple DUs (e.g., 2 DUs), where each of these DUs independently operates a cell tower 207. Thus, multiple towers 207 can be operated through the LDCs 204 using multiple DUs using the clusters. The LDCs 204 may be placed in bigger metropolitan areas whereas individual cell sites 206 may be placed at smaller population areas.

Figure 3:
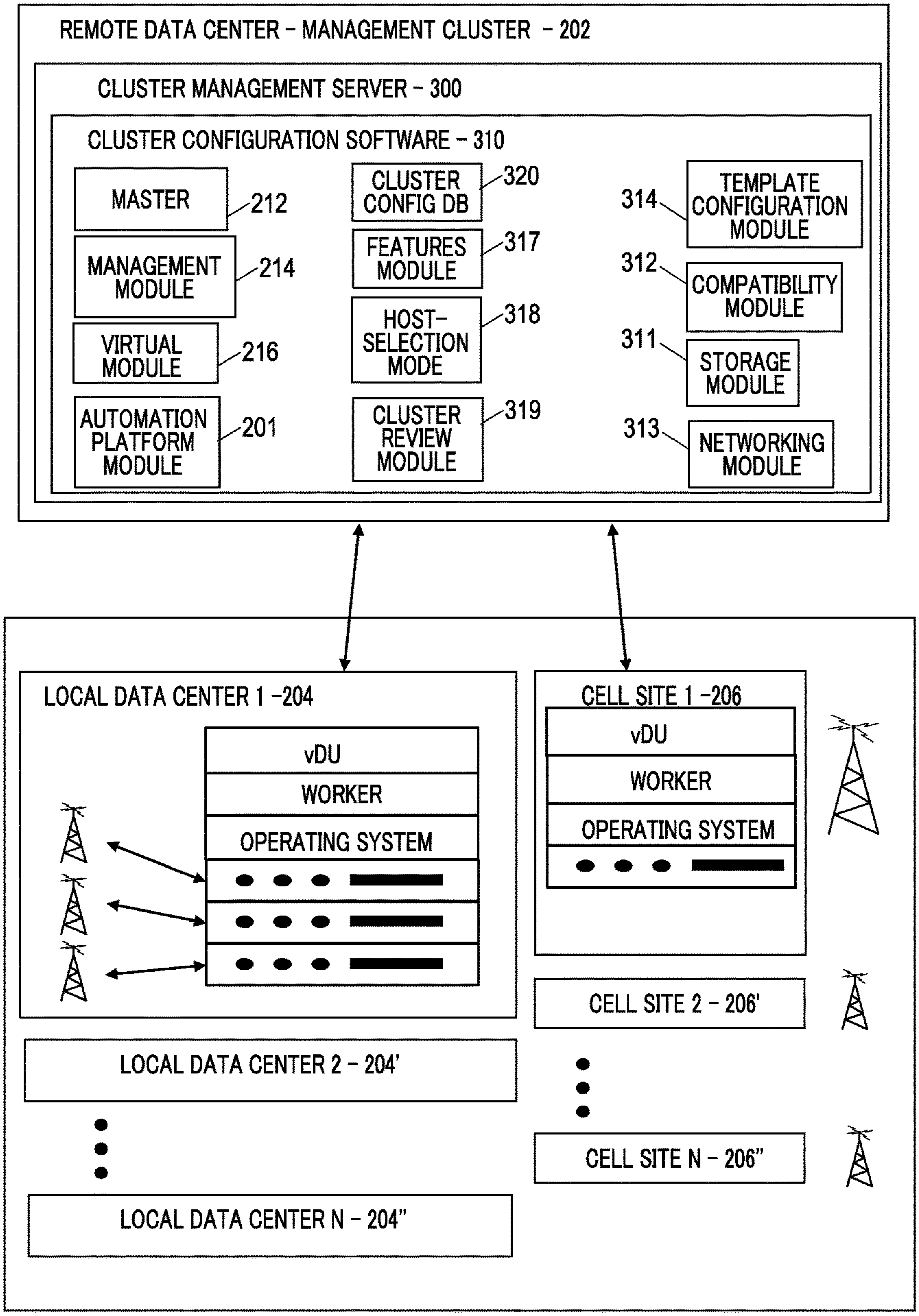
FIG. 3 illustrates a block diagram of the system of FIG. 2 but further illustrating details of cluster configuration software, according to various embodiments.

FIG. 3 illustrates a block diagram of the system of FIG. 2 but further illustrating details of cluster configuration software, according to various embodiments.

As illustrated, a cluster management server 300 is configured to run the cluster configuration software 310. The cluster configuration software 310 runs using computing resources of the cluster management server 300. The cluster management server 300 is configured to access a cluster configuration database 320. In one embodiment, the cluster configuration database 320 includes a host list with data related to a plurality of hosts 330 including information associated with hosts, such as host capabilities. For instance, the host data may include list of hosts 330 accessed and managed by the cluster management server 300, and for each host 330, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 300.

In addition to the data related to hosts 330, the cluster configuration database 320 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster.

Each host is associated with a local storage and is configured to support the corresponding containers running on the host. Thus, the host data may also include details of containers that are configured to be accessed and managed by each of the hosts 330. The cluster management server 300 is also configured to access one or more shared storage and one or more shared network.

The cluster configuration software 310 includes one or more modules to identify hosts and features and manage host-feature compatibility during cluster configuration. The configuration software 310 includes a compatibility module 312 that retrieves a host list and a features list from the configuration database 320 when a request for cluster construction is received from the client. The compatibility module 312 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses.

It should be noted that the aforementioned list of compatibilities are exemplary and should not be construed to be limiting. For instance, for a particular advanced feature, such as fault tolerance, the compatibility module checks whether the hosts provide a compatible processor family, host operating system, hardware virtualization enabled in the BIOS, and so forth, and whether appropriate licenses have been obtained for operation of the same. Additionally, the compatibility module 312 checks to determine if networking and storage requirements for each host in the cluster configuration database 320 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the desired speed connection and access to the right subnet to take advantage of the selected features. The networking and storage requirements are captured in the configuration database 320 during installation of networking and storage devices and are used for checking compatibility.

The compatibility module 312 identifies a set of hosts accessible to the management server 300 that either matches the requirements of the features or provides the best match and constructs a configuration template that defines the cluster configuration settings or profile that each host needs to conform in the configuration database 320. The configuration analysis provides a ranking for each of the identified hosts for the cluster. The analysis also presents a plurality of suggested adjustments to particular hosts so as to make the particular hosts more compatible with the requirements. The compatibility module 312 selects hosts that best match the features for the cluster. The cluster management server 300 uses the configuration settings in the configuration template to configure each of the hosts for the cluster. The configured cluster allows usage of the advanced features during operation and includes hosts that are most compatible with each other and with the selected advanced features.

In addition to the compatibility module 312, the configuration software 310 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 314 may be used to construct a configuration template to which each host in a cluster may conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 320.

A configuration display module may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 317 may be used for mining features for cluster construction. The features module 317 is configured to provide an interface to enable addition, deletion, and/or customization of one or more features for the cluster. The changes to the features are updated to the features list in the configuration database 320. A host-selection module 318 may be used for mining hosts for cluster configuration. The host-selection module 318 is configured to provide an interface to enable addition, deletion, and/or customization of one or more hosts. The host-selection module 318 is further configured to compare all the available hosts against the feature requirements, rank the hosts based on the level of matching and return the ranked list along with suggested adjustments to a cluster review module 319 for onward transmission to the client for rendering.

The cluster review module 319 may be used to present the user with a proposed configuration returned by the host-selection module 318 for approval or modification. The configuration can be fine-tuned through modifications in appropriate modules during guided configuration set-up which are captured and updated to the host list in either the configuration database 320 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 312 provides a tool to analyze various combinations of hosts before selecting the best hosts for the cluster.

A storage module 311 enables selection of storage requirements for the cluster based on the host connectivity and provides an interface for setting up the storage requirements. Shared storage may be needed in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 320 which is, in turn, based on compatibility with prior settings of hosts, networks and advanced features and enables editing of a portion of the default storage settings to take advantage of the advanced features. In one embodiment, if a certain storage is available to only a selected number of hosts in the cluster, the storage module 311 will provide necessary user alerts in a user interface with tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 320 as primary storage for the cluster during cluster configuration.

A networking module 313 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

FIG. 3 also illustrates cell sites 206, 206', 206" that are configured to be clients of each cluster. Each cell site 206, 206', 206" is shown as includes a cellular tower 207 and a connection to each distributed unit (DU), similar to FIG. 2. Each DU is labeled as a virtualized distributed unit (vDU) 209, similar to FIG. 2, and each DU runs as virtual network functions (VNFs) within the an open source network functions virtualization (NFV) infrastructure.

Figure 4:
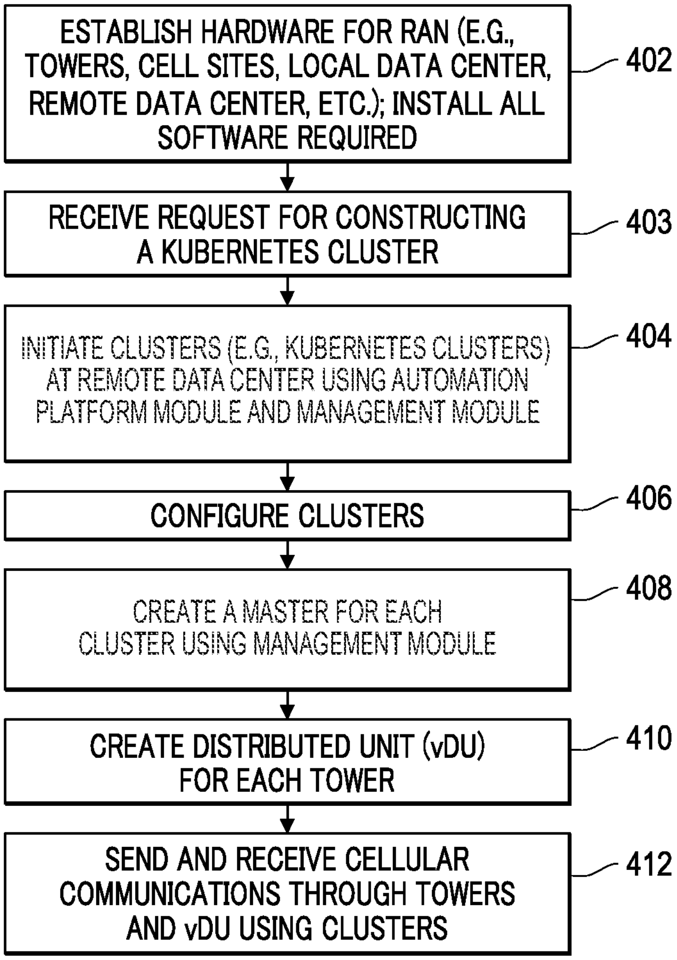
FIG. 4 illustrates a method of establishing cellular communications using kubernetes clusters.

With the above overview of the various components of a system used in the cluster configuration, specific details of how each component is used in establishing and communicating through a cellular network using kubernetes clusters, as shown in FIG. 4.

First, all of the hardware for establishing a cellular network (e.g., a RAN, which includes towers, RRUs, DUs, CU, etc.) and a cluster (e.g., servers, kubernetes workers, etc.) are provided, as described in block 402. The LDC 204, RDC 202, and cell sites 206, 206', 206" are created and networked together via a network.

In blocks 403-408, the process of constructing a cluster using plurality of hosts will now be described.

The process begins at block 403 with a request for constructing a cluster from a plurality of hosts which support one or more containers. The request is received at the automation platform module 201 from a client. The process of receiving a request for configuring a cluster then triggers initiating the clusters at the RDC 202 using the automation platform module 201, as illustrated in block 404.

In block 406, the clusters are configured and this process will now be described with reference to FIGS. 2-3.

The automation platform module 201 is started by a system administrator or by any other user interested in setting up a cluster. The automation platform module 201 then invokes the cluster configuration software on the cluster management server, such as a virtual module server, running cluster configuration software.

The invoking of the cluster configuration software triggers the cluster configuration workflow process at the cluster management server by initiating a compatibility module 312. Upon receiving the request for constructing a cluster, the compatibility module 312 queries a configuration database available to the management server and retrieves a host list of hosts that are accessible and managed by the management server and a features list of features for forming the cluster. The host list contains all hosts managed by the management server and a list of capabilities of each host. The list of capabilities of each host is obtained during installation of each host. The features list contains all licensed features that have at least a minimum number of host licenses for each licensed feature, a list of requirements, such as host, networking and storage requirements. The features list includes, but is not limited to, live migration, high availability, fault tolerance, distributed resource scheduling. Information in the features list and host list are obtained from an initial installation procedure before cluster configuration and through dynamic updates based on hosts and features added, updated or deleted over time and based on number of licenses available and number of licenses in use.

The compatibility module 312 then checks for the host-feature compatibility by executing a compatibility analysis for each of the hosts. The compatibility analysis compares the capabilities of the hosts in the host list with the features requirements in the features list. Some of the host capability data checked during host-feature compatibility analysis include host operating system and version, host hardware configuration, Basic Input/Output System (BIOS) Feature list and whether power management is enabled in the BIOS, host computer processor family (for example, Intel, AMD, and so forth), number of processors per host, number of cores available per processor, speed of execution per processor, amount of internal RAM per host, shared storage available to the host, type of shared storage, number of paths to shared storage, number of hosts sharing the shared storage, amount of shared storage per host, type of storage adapter, amount of local storage per host, number and speed of network interface devices (NICs) per host. The above list of host capability data verified during compatibility analysis is exemplary and should not be construed as limiting.

Some of the features related data checked during compatibility analysis include determining number of licenses to operate an advanced feature, such as live migration/distributed resource scheduling, number and name of hosts with one or more Gigabit (GB) Network Interface Card/Controller (NIC), list of hosts on same subnet, list of hosts that share same storage, list of hosts in the same processor family, and list of hosts compatible with Enhanced live migration (e.g., VMware Enhanced VMotion) compatibility. The above list of feature related compatibility data is exemplary and should not be construed as limiting.

Based on the host-feature compatibility analysis, the compatibility module determines if there is sufficient host-feature compatibility for hosts included on the host list with the features included on the features list to enable a cluster to be constructed that can enable the features. Thus, for instance, for a particular feature, such as fault tolerance, the compatibility module checks whether the hosts provide hardware, software and license compatibility by determining if the hosts are from a compatible processor family, the hosts operating system, BIOS features enabled, and so forth, and whether there are sufficient licenses for operation of features for each host. The compatibility module also checks to determine whether networking and storage resources in the cluster configuration database for each host is compatible with the feature requirements. Based on the compatibility analysis, the compatibility module 312 generates a ranking of each of the hosts such that the highest ranked hosts are more compatible with the requirements for enabling the features. Using the ranking, the compatibility module 312 assembles a proposed cluster of hosts for cluster construction. In one embodiment, the assembling of hosts for the proposed cluster construction is based on one or more pre-defined rules. The pre-defined rules can be based on the hosts capabilities, feature requirements or both the hosts capabilities and feature requirements. For example, one of the pre-defined rules could be to identify and select all hosts that are compatible with the requirements of the selected features. Another pre-defined rule could be to select a given feature and choosing the largest number of hosts determined by the number of licenses for the given feature based on the compatibility analysis. Yet another rule could be to select features and choosing all hosts whose capabilities satisfy the requirements of the selected features. Another rule could be to obtain compatibility criteria from a user and selecting all features and hosts that meet those criteria. Thus, based on the pre-defined rule, the largest number of hosts that are compatible with the features are selected for forming the cluster.

Based on the compatibility analysis, a host configuration template is constructed to include the configuration information from the proposed cluster configuration of the hosts. A list of configuration settings is defined from the host configuration template associated with the proposed cluster configuration of the hosts. Each of the hosts that are compatible will have to conform to this list of cluster configuration settings. The cluster configuration settings may be created by the compatibility module 312 or a template configuration module 314 that is distinct from the compatibility module. The configuration settings include network settings, such as number of NICs, bandwidth for each NIC, etc., storage settings and hardware configuration profile, such as processor type, etc. Along with the configuration settings, the compatibility module presents a plurality of suggested adjustments to particular hosts to enable the particular hosts to become compatible with the requirements. The suggested adjustment may include guided tutorials providing information about the incompatible hosts, and steps to be taken for making the hosts compatible as part of customizing the cluster. The cluster configuration settings from the configuration template are returned for rendering on a user interface associated with the client.

In one embodiment, the user interface is provided as a page. The page is divided into a plurality of sections or page elements with each section providing additional details or tools for confirming or customizing the current cluster.

The configuration settings from a configuration template are then rendered at the user interface on the client in response to the request for cluster configuration. If the rendered configuration settings are acceptable, the information in the configuration template is committed into the configuration database for the cluster and used by the management server for configuring the hosts for the cluster. The selected hosts are compatible with the features and with each other. Configuration of hosts may include transmitting storage and network settings from the host configuration template to each of the hosts in the cluster, which is then applied to the hosts. The application of the configuration settings including network settings to the hosts may be done through a software module available at the hosts, in one embodiment of the invention. In one embodiment, a final report providing an overview of the hosts and the cluster configuration features may be generated and rendered at the client after applying the settings from the configuration template. The cluster configuration workflow concludes after successful cluster construction with the hosts.

The cluster creation process further includes creating master modules 212 for each of the clusters being created, as provided in block 408. This is because each master module controls and monitors performance of the respective cluster. Also, in block 410, the DUs are also installed over the workers so that the DUs can communicate with the CU in the core network. In this regard, the DUs are installed to communicate with a tower and a respective RRU to transmit communication received therewith to the CU and vice versa.

Once the clusters are created, communication between the clusters in the data centers occurs through the towers and DUs using the clusters, as provided in block 412. In this regard, communication is facilitated and monitored using the master modules 212. The clusters include containers running on the clusters and the DUs are running in the containers. In this regard, when voice and data that is received through a tower is received through the RRU and DU, they are then communicated through the containerized application (e.g., kubernetes cluster) network and then routed to a corresponding location it is addressed to. In this regard, the containerized application (e.g., kubernetes cluster) network is used as a network to communicate data between the DUs and the CU and vice versa. This network may be configured as a mesh network to easily distribute data quickly as well as having easily configured containerized applications that can be customized and updated on the fly.

Accordingly, a 5G network can be established using containerized applications (e.g., kubernetes) clusters which is more stable and managed more effectively than previous systems. Workloads of clusters can be managed by the master modules so that any processing that is high on one server can be distributed to other servers over the kubernetes clusters. This is performed using the master module which is continuously and automatically monitoring the workloads and health of all of the DUs.

Stretching the Containerized Applications

In some embodiments, containerized applications (e.g., kubernetes clusters) are used in 5G to stretch a private cloud network to/from a public cloud network. Each of the workload clusters in a private network is controlled by master nodes and support functions (e.g. MTCIL) that are run in the public cloud network.

Also, generally, a virtualization platform runs the core and software across multiple geographic availability zones. A data center within a public network/cloud stretches across multiple availability zones ("AZs") in a public network to host: (1) stack management and automation solutions (e.g. the automation platform module, the virtual module, etc.) and (2) cluster management module and the control plane for the RAN clusters. If one of the availability zones fails, another of the availability zones takes over, thereby reducing outages. More details are presented below of this concept.

A private network (sometimes referred to herein as a data center) resides on a company's own infrastructure, and is typically firewall protected and physically secured so that only those authorized by the company can access the private network. An organization may create a private network by creating an on-premises infrastructure, which can include servers, towers, RRUs, and various software, such as DUs. Private networks are supported, managed, and eventually upgraded or replaced by the organization. Since private clouds are typically owned by the company, there is no sharing of infrastructure, no multitenancy issues, and zero latency for local applications and users. To connect to the private network, a user's device can be authenticated, such as by using a pre-authentication key, authentication software, authentication handshaking, and the like.

Public networks alleviate the responsibility for management of the infrastructure since they are by definition hosted by a public network provider such as AWS, Azure, or Google Cloud. In an infrastructure-as-a-service (IaaS) public network deployment, enterprise data and application code reside on the public network provider servers. Although the physical security of hyperscale public network providers (such as AWS) is unmatched, there is a shared responsibility model that may have organizations that subscribe to those public network services to ensure their applications and network are secure, for example, by monitoring packets for malware or providing encryption of data at rest and in motion.

Public networks are shared, on-demand infrastructure and resources delivered by a third-party provider. In a public network deployment, the company utilizes one or more types of cloud services such as software-as-a-service (SaaS), platform-as-a-service (PaaS) or IaaS from public providers such as AWS or Azure, without relying to any degree on private cloud (on-premises) infrastructure.

As mentioned above, a private network is a dedicated, on-demand infrastructure and resources that are owned by the user organization. Users may access private network resources over a private network or VPN; external users may access the organization's IT resources via a web interface over the public network. Operating a large data center as a private network can deliver many benefits of a public network, especially for large organizations.

In its simplest form, a private network is a service that is controlled by one or more organizations according to some embodiments, while a public network may be a subscription service that is also offered to any and all customers who want similar services.

Regardless, because cellular networks are private networks run by a cellular provider, and the control of the containerized applications (e.g., kubernetes clusters) and the control plane needs to be on a public network which has more processing power and space, the containerized applications (e.g., kubernetes clusters) need to originate on the public network and extend or "stretch" to the private network. The term "stretch" the cluster between public and private networks means to extend or connect the cluster between public and private networks so that communications are set up or programmed to manually or automatically occur between these public and private networks when the communications are authenticated or certain criteria of the communications is met.

Figure 5:
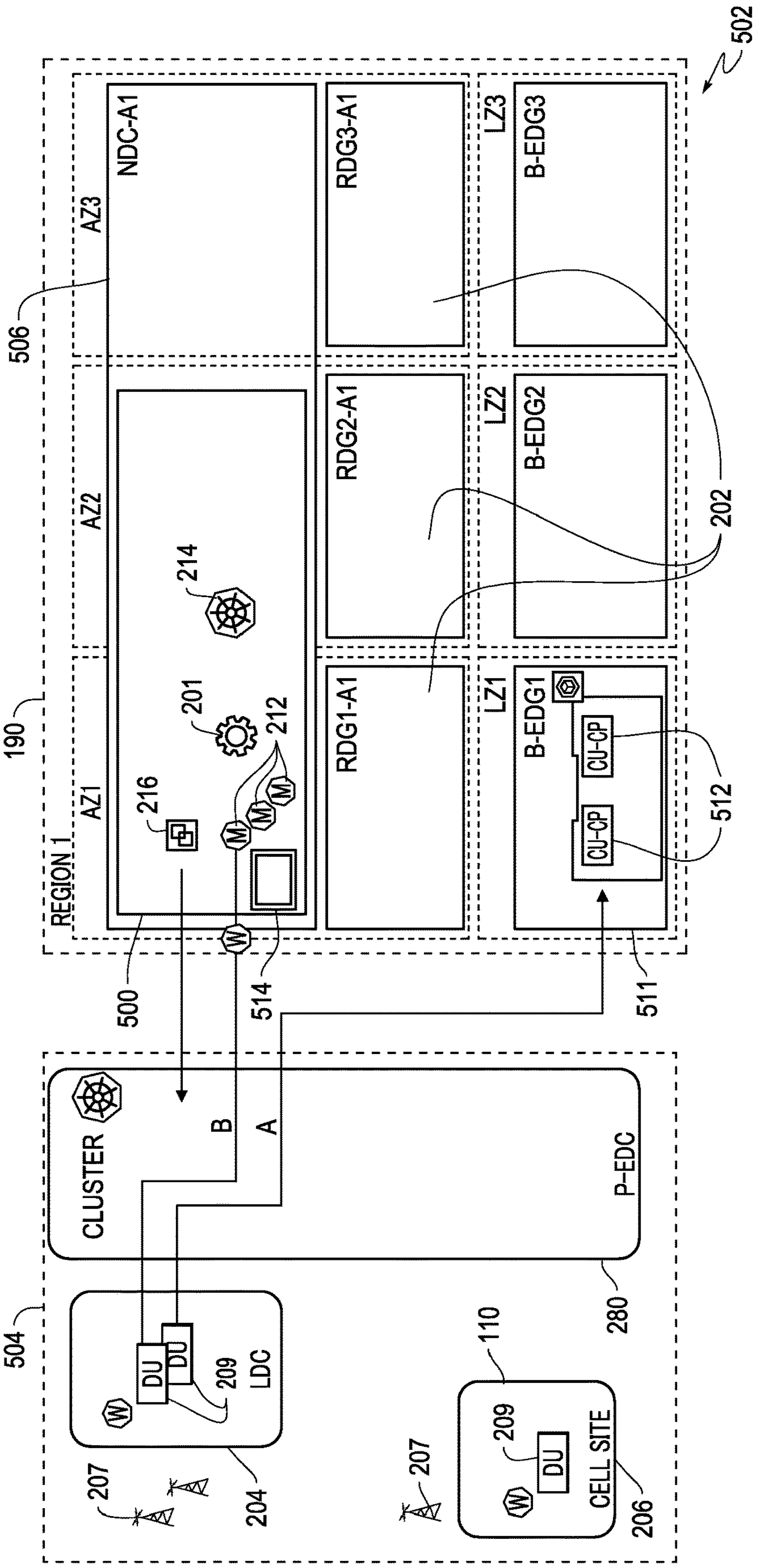
FIG. 5 illustrates a block diagram of stretching the kubernetes clusters from a public network to a private network, according to various embodiments.

FIG. 5 illustrates a block diagram of an example of stretching the containerized applications (e.g., kubernetes clusters) from a public network to a private network and across the availability zones, according to various embodiments.

This is done by the automation platform module 201 creating master modules 212 in the control plane 500 located within the public network 502. The containerized applications (e.g., kubernetes clusters) are then created as explained above but are created in both the private network 504 and the public network 502.

The public network 502 shown in FIG. 5 shows that there are three availability zones AZ1, AZ2 and AZ3. These three availability zones AZ1, AZ2 and AZ3 are in three different geographical areas. For example, AZ1 may be in the western area of the US, AZ2 may be in the midwestern area of the US, and AZ3 may be in the east coast area of the US.

A national data center (NDC) 506 is shown as deployed over all three availability zones AZ1, AZ2 and AZ3 and the workloads will be distributed over these three availability zones AZ1, AZ2 and AZ3. It is noted that the NDC 506 is a logical creation of the data center instead of a physical creation over these zones. The NDC 506 is similar to the RDC 202 but instead of being regional, it is stretched nationally across all availability zones.

It is noted that the control plane 500 stretches across availability zones AZ1 and AZ2 but could be stretched over all three availability zones AZ1, AZ2 and AZ3. If one of the zones fails the control plane 500 would automatically be deployed on the other zone. For example, if zone AZ1 fails, the control plane 500 would automatically be deployed on AZ2. This is because each of the software programs which are deployed on one zone are also deployed in the other zone and are synced together so that when one zone fails, the duplicate started software automatically takes over. This creates significant stability.

Moreover, because the communication occurs to and from a private network, the communications between the public and private networks may be performed by pre-authorizing the modules on the public network to communicate with the private network.

Each private network may include one or more LDCs and cell sites. The private network 504 in the example of FIG. 5 includes the LDC 204 and multiple cell sites 206 as well as an extended data center (EDC) 280. The LDC 204 and cell sites 206 interact with the EDC 280 as the EDC 280 acts a router for the private network 504. The EDC 280 is configured to have a concentration point where the private network 504 will extend from. All of the LDCs 204 and cell sites 206 connect to only the EDC 280 so that all of the communications to the private network 502 can be funneled through one point.

The master modules 212 control the DUs so that the clusters are properly allowing communications between the private network 504 and the public network 502. In one embodiment, there are multiple master modules 212 so that if one master module fails, one of the other master modules takes over. For example, as shown in FIG. 5, there are three master modules 212 and all three master modules 212 are synced together so that if one fails, the other two are already synced together to automatically become the controlling master.

Each of the master modules 212 performs the functions of discussed above, including creating and managing the DUs 209. This control is shown over path B which extends from a master module 212 to each of the DUs 209. In this regard, the control and observability of the DUs 209 occurs only in the public network 502 and the DUs and the containerized applications (e.g., kubernetes clusters) are in a private network 504.

There is also a module for supporting functions and PaaS 514 (the support module 514). There are some supporting functions that may be included for observability and this support module 514 will provide such functions. The support module 514 manages all of the DUs from an observability standpoint to ensure it is running properly and if there are any issues with the DUs, notifications will be provided. The support module 514 is provided on the public network 502 to monitor any of the DUs 209 across any of the availability zones.

The master modules 212 thus create and manage the containerized applications (e.g., kubernetes clusters) and create the DUs 209 and the support module 514, and the support module 514 then supports the DUs 209. Once the DUs 209 are created, they run independently, but if a DU fails (as identified by the support module 514) then the master module 212 can restart the DU 209.

Once the software (e.g., clusters, DUs 209, support module 514, master module 212, etc.) is set up and running, the user voice and data communications received at the towers 207 and is sent over the path of communication A so that the voice and data communications is transmitted from tower 207, to a DU 209, and then to the CU 512 in a EKS cluster 511. This path of communication A is separate from the path of communication B for management of the DUs for creation and stability purposes.

Figure 6:
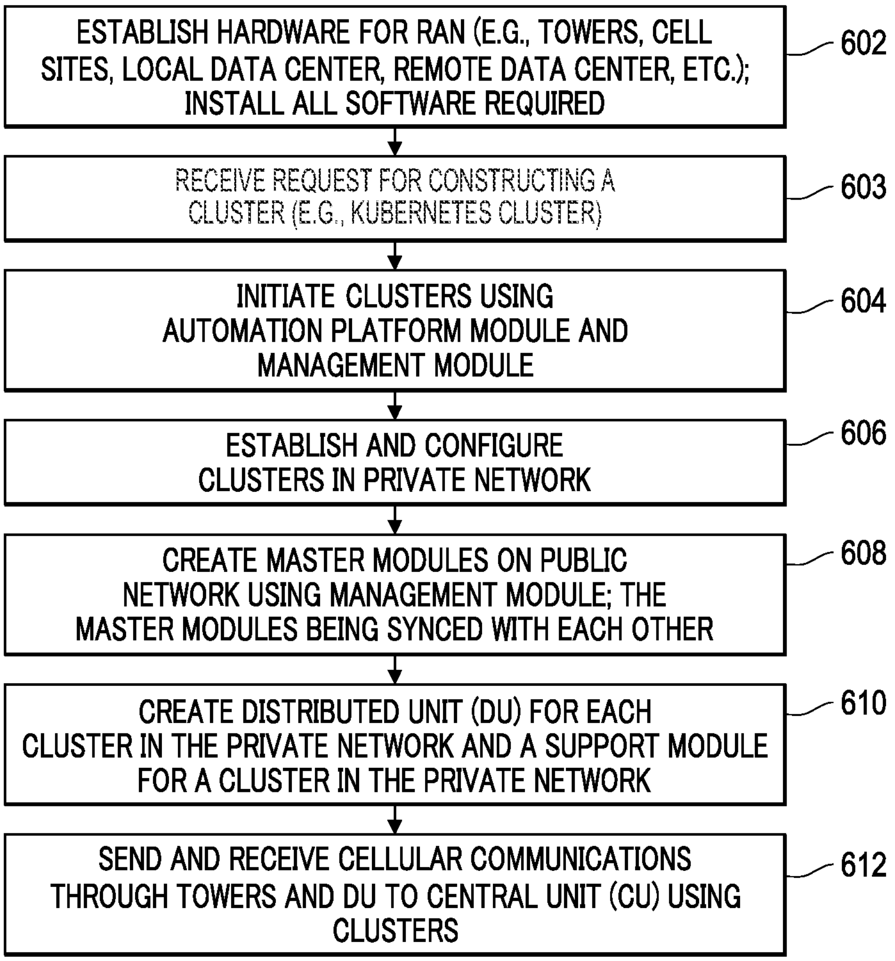
FIG. 6 illustrates a method of establishing cellular communications using kubernetes clusters stretched from a public network to a private network.

FIG. 6 illustrates a method of establishing cellular communications using containerized applications (e.g., kubernetes clusters) stretched from a public network to a private network. Blocks 602, 603 and 604 of FIG. 6 are similar to blocks 402, 403, and 404 of FIG. 4.

Block 606 of FIG. 6 is also similar to block 406 of FIG. 4 except that the containerized applications (e.g., kubernetes clusters) will be established on the private network from the public network. The containerized applications (e.g., kubernetes clusters) can also be established on the public network as well. To establish the containerized applications on the private network, the private network allows a configuration module on the public network to access the private network servers and to install the workers on the operating systems of the servers.

In block 608, master modules 212 are created on the public network 502 as explained above. One of the master modules 212 controls the workers 210 on the private network 504. As discussed above, the master modules 212 are all synced together.

In block 610, the DUs are created for each of the containerized applications (e.g., kubernetes clusters) on the private network. This is accomplished by the active master module installing the DUs from the public network. The private network allows the active master module access to the private network for this purpose. Once the DUs are installed and configured to the RRUs and the corresponding towers, the DUs then can relay communications between the towers and the CU located on the public network.

Also in block 610, the support module is created on the public network and is created by the active master module. This support module provides the functions as established above and the private network allows access thereto for such support module to monitors each of the DUs on the private network.

Last, block 612 of FIG. 6 is similar to block 412 of FIG. 4. However, the communications proceed along path A in FIG. 5 as explained above and the management and monitoring of the DUs is performed along the kubernetes clusters along path B.

Observability

While the network is running the support module will collect various data to ensure the network is running properly and efficiently. This observability framework ("OBF") collects telemetry data from all network functions that will enable the use of artificial intelligence and machine learning to operate and optimize the cellular network.

This adds to the telecom infrastructure vendors that support the RAN and cloud-native technologies as a provider of Operational Support Systems ("OSS") services. Together, these OSS vendors will aggregate service assurance, monitoring, customer experience and automation through a singular platform on the network.

The OBF brings visibility into the performance and operations of the network's cloud-native functions ("CNFs") with near real-time results. This collected data will be used to optimize networks through its Closed Loop Automation module, which executes procedures to provide automatic scaling and healing while minimizing manual work and reducing errors.

Figure 7:
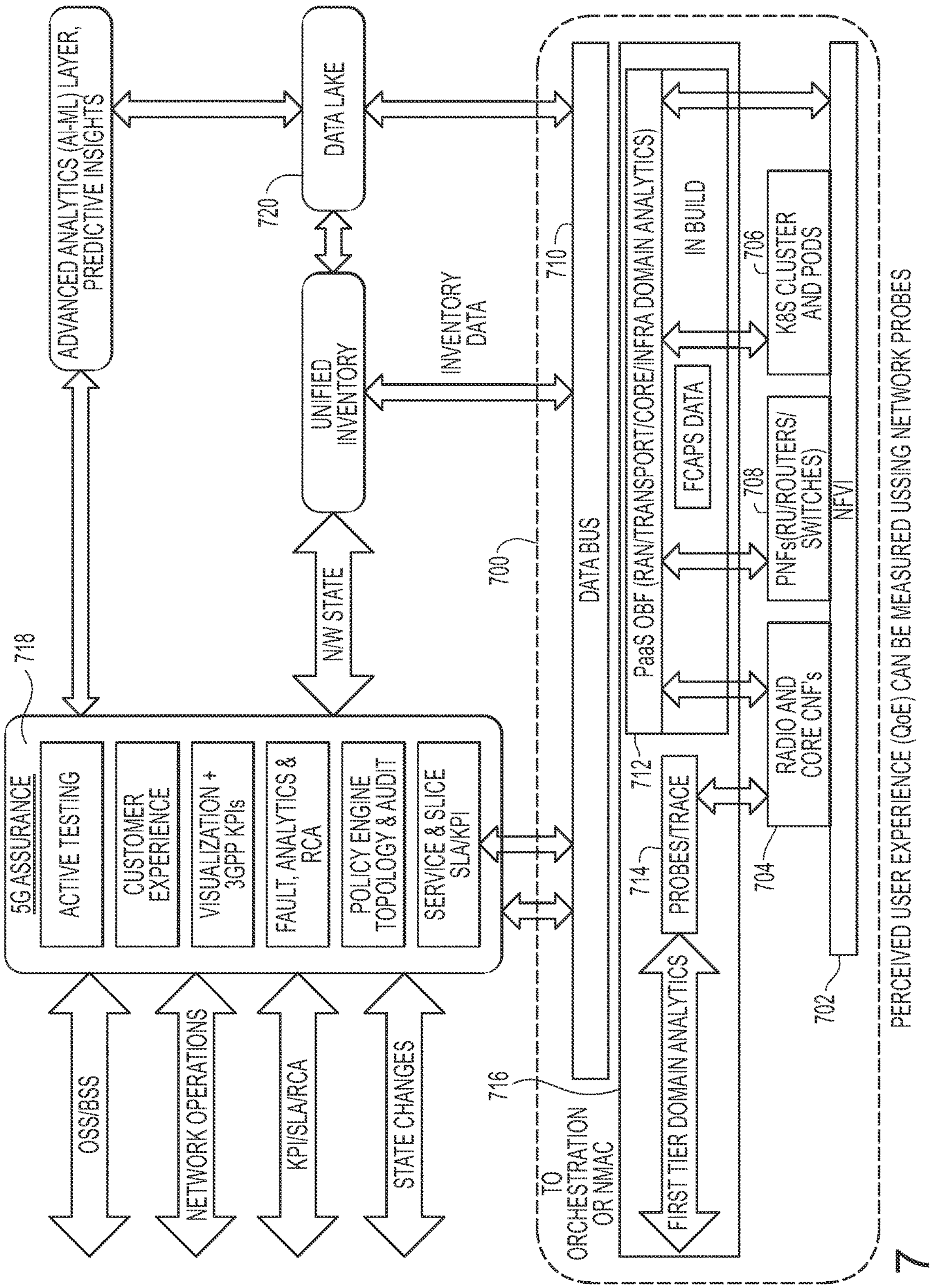
FIGS. 7, 8 and 9 illustrate a system with a centralized observability framework, according to various embodiments.

This is shown in FIG. 7, which is described below.

FIG. 7 illustrates the network described above but also explains how data is collected according to various embodiments. The system 700 includes the networked components 702-706 as well as the observability layers 710-714.

First, a network functions virtualization infrastructure ("NFVI") 702 encompasses all of the networking hardware and software needed to support and connect virtual network functions in carrier networks. This includes the cluster creation using containerized applications as discussed herein.

On top of the NVFI, there are various domains, including the Radio (or RAN) and Core CNFs 704, clusters (e.g., kubernetes clusters) and pods/containers) 706 and physical network functions ("PNFs") 708, such as the RU, routers, switches and other hardware components of the cellular network. These domains are not exhaustive and there may be other domains that could be included as well.

The domains transmit their data using probes/traces 714 to a common source, namely a Platform as a Server ("PaaS") OBF layer 712. The PaaS OBF layer 712 may be located within the support module on the public network so that it is connected to all of the DUs and CU to pull all of the data from the RANs and Core CNFs 704. As such all of the data relating to the RANs and Core CNFs 704 are retrieved by the same entity deploying and operating the each of the DUs of the RANs as well as the operator of the Core CNFs. In other words, the data and observability of these functions do not need to be requested from vendors (i.e., third parties) of these items and instead may be transmitted to the same source which is running these functions, such as the administrator of the cellular network.

The data retrieved are key performance indicators ("KPI") and alarms/faults. KPI are the critical indicators of progress toward performing cellular communications and operations of the cellular network. KPIs provides a focus for strategic and operational improvement, create an analytical basis for decision making and help focus attention on what matters most. Performing observability with the use of KPIs includes setting targets (the desired level of performance) and tracking progress against that target.

The PaaS OBF and data bus (e.g., kafka bus) retrieves the distributed data collection system so that such data can be monitored. This system uses the kubernetes cluster structure, uses a data bus (e.g., kafka) as an intermediate node of data convergence, and finally use data storage for storing the collected and analyzed data.

In this system, the actual data collection tasks may be divided into two different functions. First the PaaS OBF is responsible for collecting data from each data domain and transmitting it to the data bus and then, the data bus is responsible for persistent storage of data collected from data bus consumption after aggregation. The master is responsible for maintaining the deployment of the PaaS OBF and data bus and monitoring the execution of these collection tasks.

It should be noted that a data bus may be any data bus but in some embodiments, the data bus is a kafka bus but the present invention should not be so limited. Kafka may be used herein simply as illustrative examples. Kafka is currently an open source streaming platform that allows one to build a scalable, distributed infrastructure that integrates legacy and modern applications in a flexible, decoupled way.

The PaaS OBF performs the actual collection task after registering with the master module. Among the tasks, the PaaS OBF aggregates the collected data into the data bus according to the configuration information of the task, and stores the data in specified areas of the data bus according to the configuration information of the task and the type of data being collected.

Specifically, when PaaS OBF collects data, it needs to segment data by time (e.g., data is segmented in hours), and the time segment information where data is located is written as well as the collected data entity in the data bus. In addition, because the collected data is stored in the data bus in the original format, other processing systems can transparently consume the data in the data bus without making any changes.

In the process of executing the actual collection task, the PaaS OBF also needs to maintain the execution of the collection task, and regularly reports it to the specific data bus, waiting for the master to pull and cancel the consumption. By consuming the heartbeat data reported by the slave in Kafka (for example), the master can monitor the execution of the collection task of the PaaS OBF and the data bus.

As can be seen, all of the domains may be centralized in a single layer PaaS OBF. If some of the domains are provided by some vendors and other by other vendors and these vendors would typically collect data at their networks, the PaaS OBF collects all of the data over all vendors and all domains in a single layer 714 and stores the data in a centralized in long term storage using the data bus, in some exemplary embodiments. This data is all accessible to the system at a centralized database or centralized network, such as network 502 discussed above with regard to FIG. 5. Because all of the data is stored in one common area from various different domains and even from product managed by different vendors, the data can then be utilized in a much more efficient and effective manner.

After the data is collected across multiple domains, the data bus (e.g., kafka) is used to make the data available for all domains. Any user or application can receive data to the data bus to retrieve data relevant to thereto. For example, a policy engine from a kubernetes cluster may not be getting data from the Kafka bus, but through some other processing, it indicates that may need to receive data from the Radio and Core CNF domain so it can start pulling data from the Kafka bus or data lake on its own.

The data bus is a software module which is configured to be linked with all of the PaaS OBF layer (short term storage) so that any application requesting data will request the data to the data bus which then will process such request and retrieve the data requested. As mentioned above, such data bus may be a data bus. In one embodiment, the data bus extends completely over the PaaS OBF layer so that all of the data collected over all domains of the cellular network system via containerized clusters can be easily retrieved in a single system.

It should be known that any streaming platform bus may be used and the Kafka bus is used for ease of illustration of the invention and the present invention should not be limited to such a Kafka bus.

Kafka is unique because it combines messaging, storage and processing of events all in one platform. It does this in a distributed architecture using a distributed commit log and topics divided into multiple partitions.

With this distributed architecture, the above-described data bus is different from existing integration and messaging solutions. Not only is it scalable and built for high throughput but different consumers can also read data independently of each other and in different speeds. Applications publish data as a stream of events while other applications pick up that stream and consume it when they want. Because all events are stored, applications can hook into this stream and consume as required—in batch, real time or near-real-time. This means that one can truly decouple systems and enable proper agile development. Furthermore, a new system can subscribe to the stream and catch up with historic data up until the present before existing systems are properly decommissioned. The uniqueness of having messaging, storage and processing in one distributed, scalable, fault-tolerant, high-volume, technology-independent streaming platform provides an advantage over not using the above-described data bus extending over all layers.

There are two types of storage areas for collection of the data. The PaaS OBF is the first storage shown in box 716. In this regard, the collection of data is short term storage by collecting data on a real time basis on the same cloud network where the core of the RAN is running and where the master modules are running (as opposed to collecting the data individually at the vendor sites). By short term, this means that storage could be anywhere from 1-7 days, 1-3 days, 3-7 days, or the like in some embodiments.

The short term storage may have time sensitive use cases that collect from this layer and other applications will collect data from the long term storage layer. The data flow shown below is a new type of data flow that has not been used prior to the present application.

In this regard, the data is centralized for short term storage.

Then, the second data storage is shown as box 718, which is longer term storage on the same cloud network as the first storage 714 and the core of the RAN. This second data storage allows data that can be used by any applications without having to request the data on a database or network in a cloud separate from the core and master modules.

In one embodiment, the long term storage layer will be a federated data lake closest to the source.

There are other storage types as well which may provide more of a permanent storage for data history purposes.

In any event, the data is first collected in the OBF layer (short term storage), whereby the data is then transported by the OBF layer to the longer term storage layer and can be fed directly back to the network workloads. Also, the data will also be sent over the data bus to various use applications that require real-time data pulled directly from short term data, such as MEC, security, etc.

It should be noted that the data collected for all storage types are centralized to be stored on the public network, such as the public network 502 discussed above with regard to FIG. 5.

Figure 8:
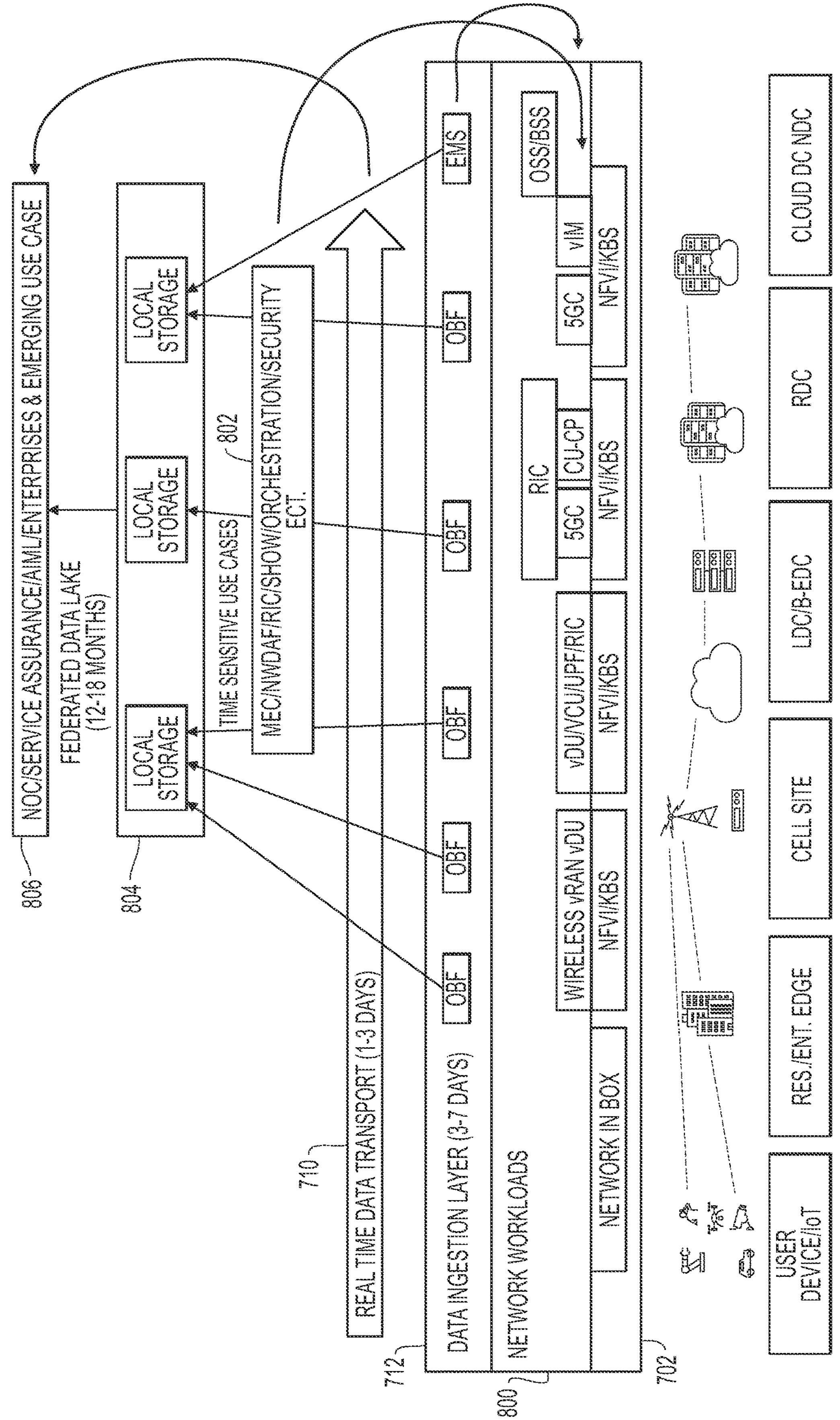
Figure 9:
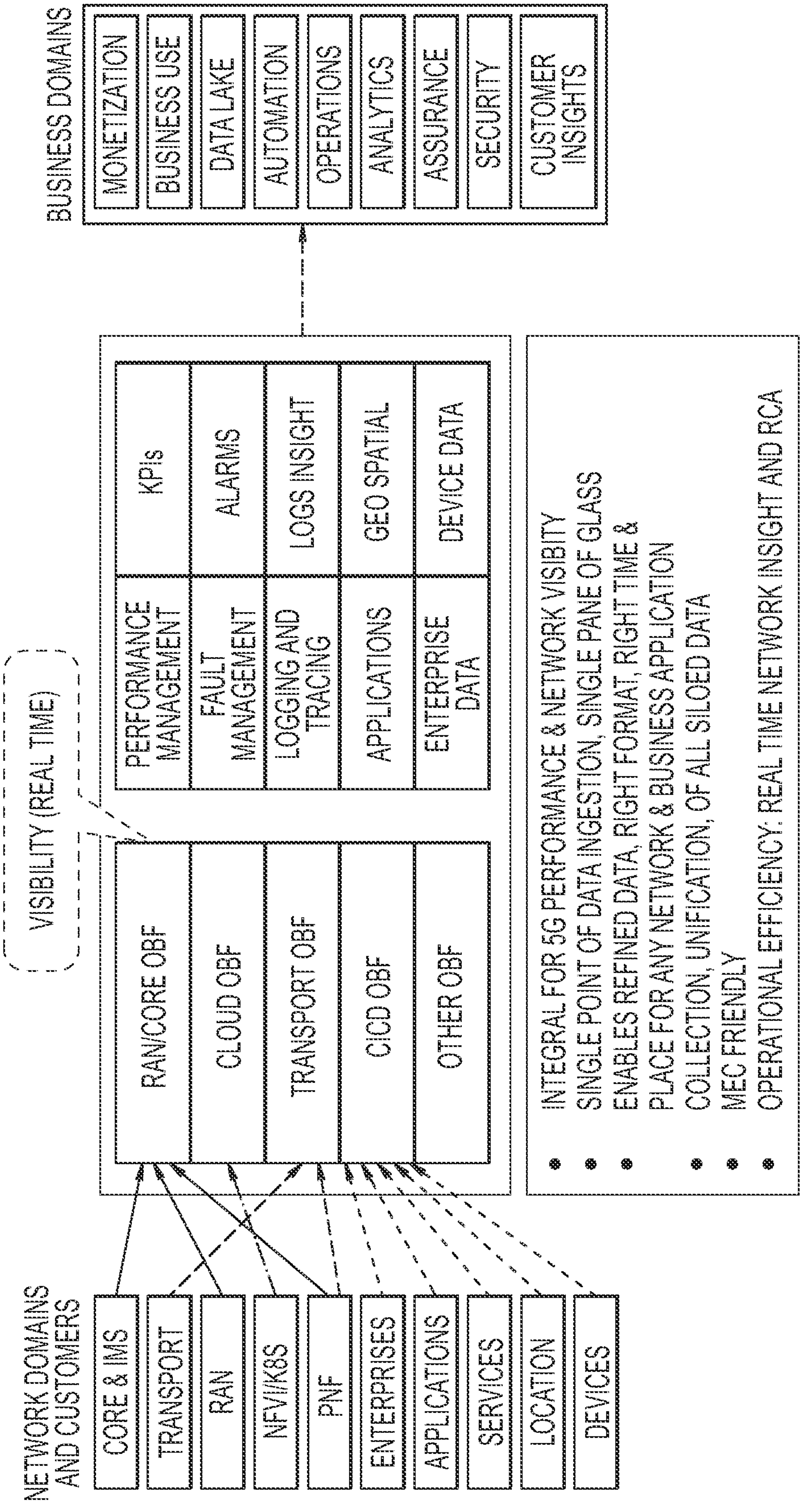

FIGS. 8 and 9 show an overall architecture of the OBF as well as the layers involved. First, in FIG. 8, there are three layers shown: the PaaS OBF layer 712, the data bus 710 and the storage layer 804. There are time sensitive use applications 802 which use the data directly from the data bus for various monitoring and other applications which need data on a more real-time basis, such as MEC, security, orchestration, etc. Various applications may pull data from the PaaS OBF layer since this is a real-time data gathering.

There are other use cases 806 that can obtain data either from the PaaS OBF layer 712, the data bus layer 710 and the storage layer 804, depending on the applications. Some applications may be NOC, service reassurance, AIML, enterprises, emerging use, etc.

As shown in FIG. 8, there are more details on various domains 800, such as cell sites (vDU, vRAN, etc.), running on the NFVI 702 layer. Also, as shown, the NFVI receives data from various hardware devices/sites, such as from cell sites, user devices, RDC, etc.

In FIG. 9, the network domains and potential customers/users are shown on the left with core and IMS, transport, RAN, NFC/kubernetes (K8S), PNF, enterprises, applications, services, location, and devices. All of these domains are collected in one centralizes location using various OBF collection means. For example, data from the core and IMS, RAN, and NFC/kubernetes domains are collected using the RAN/Core OBF platform of the PaaS layer 712. Also, data from the RAN and PNF domains are collected on the transport OBF layer. In any event, all of the data from the various domains and systems, whether or not there are multiple entities/vendors managing the domains, are collected at a single point or single database and on a common network/server location. This allows the applications (called "business domains" in the righthand side of FIG. 9) to have a single point of contact to retrieve whatever data is needed for those applications, such as security, automation, analytics, assurance, etc.

Figure 10:
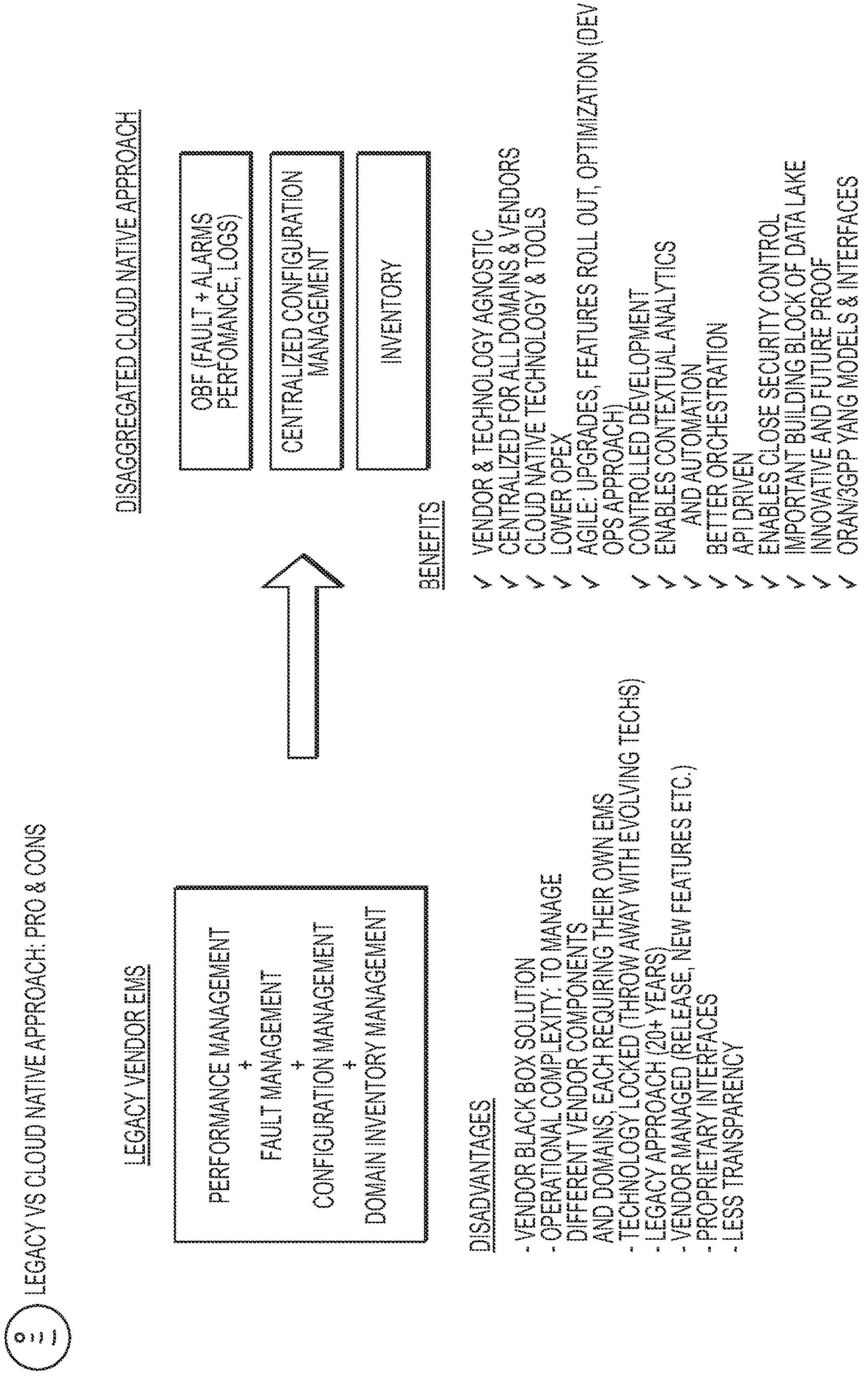
FIG. 10 illustrates a block diagram illustrating differences between other embodiments and embodiments of the present application, according to some embodiments.

FIG. 10 illustrates other embodiments compared with embodiments of the present application. Previously, vendors had a single "black box" for vendors' EMS (e.g., performance management, fault management, configuration management, domain inventory management, etc.). The embodiment on the left is such "black box" type approach having various propriety interfaces and storing data at the vendor locations, different databases and at different server locations and networks. This embodiment requires different EMS systems and managed by different entities. It has less transparency and more difficulty in obtaining and using data in a simplified manner.

On the other hand, on the right-hand side of FIG. 10, instead of such "black box" approach, the present application is making multiple systems, including the observability framework (discussed above), a centralized configuration management, and the inventory (which is covered above in the data storage layers concepts of the present application).

The centralized configuration management concept relates to having a centralized software module which is configured to manage all of the use applications and analytics from a single source as opposed to multiple sources at multiple vendors. For example, the support module is allowed to retrieve observability data over all domains in order to monitor and analyze the data on a real-time basis. In this regard, a single source on the public network can manage the functions and network using the observability framework and the inventory layers. This was not possible prior to the present application.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A cellular network system comprising:
- a first storage on a public network configured to:
  - collect data associated with operations of a cellular network,
  - store the data for a maximum threshold amount of time, and
  - enable first use applications requiring data to be not older than the maximum threshold amount of time to retrieve the data directly from the first storage on the public network; and
- a second storage on the public network in communication with the first storage and configured to:
  - store the data for a term greater than the maximum threshold amount of time, and enable second use applications to retrieve the data from the second storage on the public network.

2. The system of claim 1, further comprising a data bus for collecting data on a real time basis on a cloud network where the core of the cellular network is running.

3. The system of claim 2, wherein the data bus collects and stores data from a minimum of one day to a maximum of 7 days for time sensitive use cases to access data on a real time basis.

4. The system of claim 1, further comprising a data lake for collecting data on a cloud network where the core of the cellular network is running.

5. The system of claim 4, wherein the data lake collects and stores data from a minimum of 12 months for use cases which do not need the data on a real time basis.

6. The system of claim 1, wherein the applications comprise at least one of security, automation, analytics, and assurance.

7. The system of claim 1, further comprising:
- a core, transport, radio access network, PNF, or network functions virtualization infrastructure (NFVI) that generates the data.

8. A 5G cellular system for cellular communications observability, the system comprising:
- a first storage configured to:
  - collect data associated with network functions of a cellular network,
  - store the data for a maximum threshold amount of time, and
  - enable first use applications requiring data to be not older than the maximum threshold amount of time to retrieve the data directly from the first storage; and
- a second storage in communication with the first storage and configured to:
  - store the data for a term greater than the maximum threshold amount of time, and
  - enable second use applications to retrieve the data from the second storage after the maximum threshold amount of time has elapsed.

9. The system of claim 8, further comprising a data bus for collecting data on a real time basis on a cloud network where the core of the cellular network is running.

10. The system of claim 9, wherein the data bus collects and stores data from a minimum of one day to a maximum of 7 days for time sensitive use cases to access data on a real time basis.

11. The system of claim 8, wherein the second storage comprises a data lake for collecting data on a cloud network where the core of the cellular network is running.

12. The system of claim 11, wherein the data lake collects and stores data from a minimum of 12 months for use cases which do not need the data on a real time basis.

13. The system of claim 8, wherein a streaming platform data bus is disposed to collect the data and is configured to transfer the data to the second storage.

14. A method for cellular communications observability of a cellular network system, the method comprising:
- generating data from a cellular network employing clusters created using a containerized application;
- collecting, at a first data storage, the data for storage for a maximum threshold amount of time;
- ingesting and processing streaming data in real-time, using a streaming platform data store, and distributing the data to applications requesting such data, wherein the streaming platform extends completely over the first data storage so that all data collected by the first storage is available to the streaming platform data store;

storing the data in a second data storage for a term greater than the maximum threshold amount of time;

enabling first use applications requiring data to be not older than the maximum threshold amount of time to retrieve the data directly from the first data storage; and, enabling second use applications to retrieve the data from the second data storage.

15. The method of claim 14, wherein the streaming platform data store is a Kafka bus.

* * * * *